Feb. 21, 1956

J. P. TARBOX 2,735,359

BALE SIDE WIRE TIER MECHANISM

Filed April 1, 1953

INVENTOR.
John P. Tarbox
Richard E. Babcock Jr.
BY

ATTORNEY

Feb. 21, 1956      J. P. TARBOX      2,735,359
BALE SIDE WIRE TIER MECHANISM
Filed April 1, 1953      6 Sheets-Sheet 4

INVENTOR.
John P. Tarbox
Richard E. Babcock Jr.
BY
ATTORNEY

United States Patent Office 2,735,359
Patented Feb. 21, 1956

2,735,359
BALE SIDE WIRE TIER MECHANISM

John P. Tarbox, Philadelphia, Pa., assignor, by mesne assignments, to Sperry Rand Corporation, New Holland, Pa., a corporation of Delaware Application April 1, 1953, Serial No. 346,080

32 Claims. (Cl. 100—23)

This bale side wire tie mechanism is of a type I shall designate as an underlay tier for the reason that the strands which are joined together are laid into the wire twist mechanism from beneath it rather than from above it, that is to say they are drawn into the wire twisting mechanism from a space between the twister mechanism and the side of the bale case, rather than from spaces beyond the twister mechanism from the bale case. The free end strand which is to be joined to the base strand is laid in the twister mechanism by the formation of the bale itself, while the bale strand of the needle loop is laid by a bale strand engaging and laying arm or shuttle whose movements are coordinated with the movement of the needle.

The outstanding object of my invention is the simplification of such a mechanism both in construction and operation, its simplification to a point at which it requires a lesser number of parts than other bale side wire tying mechanisms and a lesser number of coordinated operations.

A second object is to improve the ruggedness and sturdiness and reliability of operation, all of which are more readily attained by reason of the simplification.

An important object ancillary to the foregoing is improvement in the means for taking hold of and clamping the extremity of the free end, an improvement which contributes very largely to the simplification sought in this underlay type of tier.

Involved in the solution of the problem encountered is a new method of retaining the free end and a new method of laying the bale strand of the needle loop. The two methods are interrelated and are mutually interactive. The method of laying the bale strand consists in engaging the needle loop comprised as usual of bale strand, bight, and spool strand, and its drawing out at two spaced points, while maintaining the spacing, passing one engagement below, beyond, and upwardly of the twister mechanism to effect the lay of the bale strand in the twister mechanism, the while maintaining the spacing between the two engagements, and passing the spool strand of the loop (which is to constitute the new free end) above the twister mechanism, after the tying of the joint severing the spool strand from the joined bale strand and forming its extremity to constitute stop means, and as a succeeding bale is formed, drawing the new free end strand and the formed extremity thereof into fixed stop engagement with free end clamping and holding means, whereby the formed extremity fixes the free end length and constitutes clamp actuating means for the free end.

In the accompanying drawings I show the best embodiment of my invention now known to me, but as always there must be other embodiments which will become known to myself and others as the art progresses.

Of the drawings

Figures 11 to 13 inclusive are semi-diagrammatic views in which the central elements of the mechanism are shown in side elevation, and which respectively show the central elements of the mechanism in the following phases of operation which take place between the inception of the tying operation shown in Figure 3 and its near conclusion and conclusion as shown in Figures 5 and 1; to wit Figure 11, that phase in which the spool strand of the needle loop is first engaged by the free end clamping and stopping device; Figure 12, that phase in which the spool strand of the loop is passed above the twisting mechanism while the bale strand is passed below and into position to effect the upward underlay of the bale strand upon the already laid free end strand; and Figure 13; that phase just following the commencement of formation of the next succeeding bale and in which the new free end strand and its stop forming end have just commenced to be drawn toward the position of ultimate lay in the twister mechanism (the tying device per se) which is shown in the same figure in dotted lines. That position is shown in full lines in Figure 11.

Having reference to these drawings, numeral 100 is applied to the wire twister mechanism at large which is of course the tying device per se, 200 to the needle mechanism at large, 300 to what we may call the primary timing mechanism which is correlated to the movements of the reciprocating baling plunger, 400 to the bale length metering mechanism, 500 to the plunger lock-out and latch mechanism, 600 to the needle drive mechanism, 700 to the secondary timing mechanism, which drives the tying device and 800 to the strand laying mechanism.

Figures 2, 14:
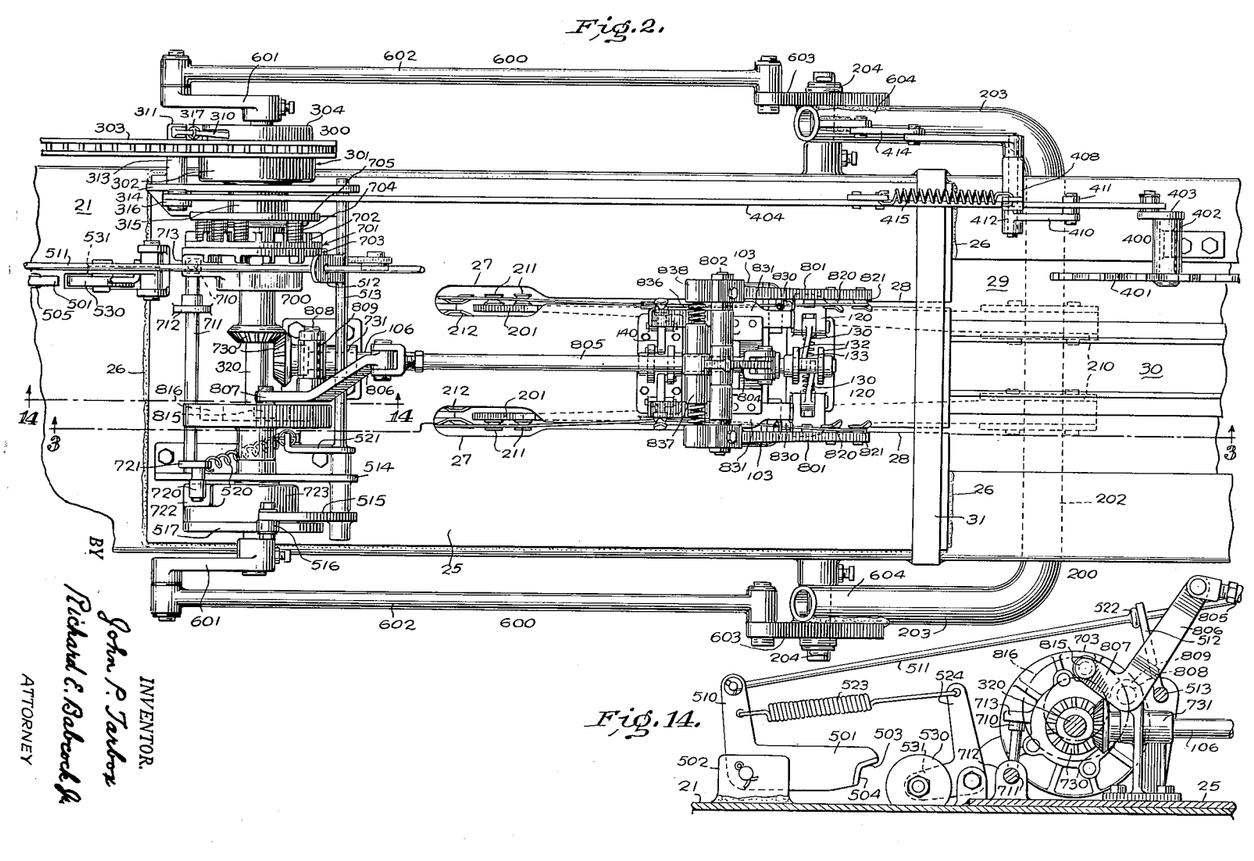
Figure 2 is a top plan view showing the parts in this same relationship.

The mechanism at large is mounted upon the top of a longitudinally extending bale case 20 whose top, bottom, and side walls are respectively designated 21, 22, 23, and 24. The mechanisms are mounted upon a longitudinally extending base plate 25 welded as at 26 or otherwise secured in mechanism mounting and bale case reinforcing relationship to the mechanism on the one hand and the bale case on the other. The bottom and top of the bale case is provided with relatively large slots 27 to permit the passage of the needles therethrough and these slots are provided with longitudinal extensions 28 of a relatively narrower width to permit the passage therethrough of the bale loop and the tied together ends of that loop, as well as the free end strand during its laying by the bale itself. These slots 28 in turn open into the space 29 which accommodates the bale tensioning device 30, which latter forms no part of the present invention. As is clear from Figure 2 these slots have their counterpart in the mounting and reinforcing plate 25. This plate is transversely unbroken in that section which underlies the mechanisms 300 and 700, and at its forward end where it is broken by the slots 28 the plate and the bale case are reinforced by a bridging strap truss 31.

Figure 3:
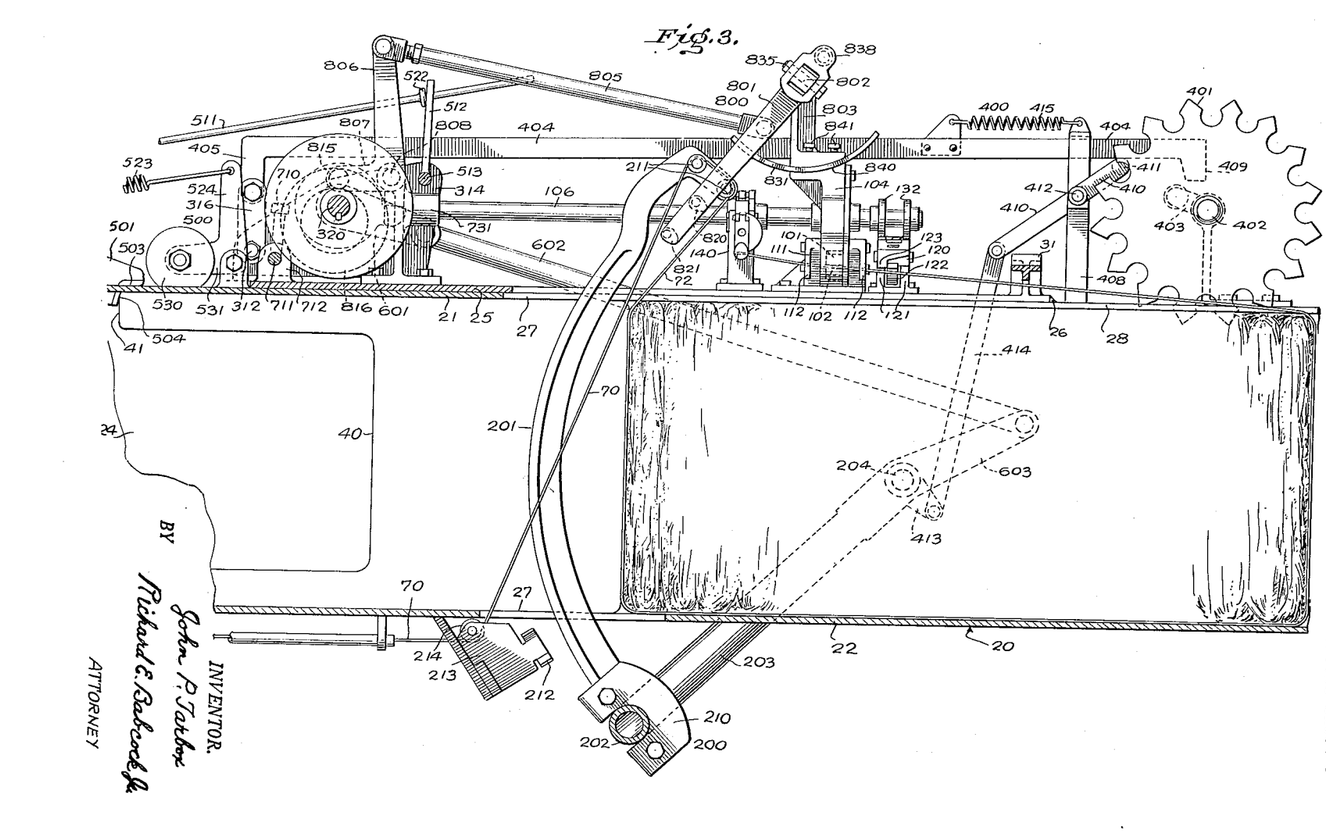
Figure 3 is also a side elevation but an elevation which in this case shows the next succeeding bale completed and the tie about it incompleted but in process, the needles having formed the needle loops and the bale strand laying device having moved into its engaging position with the bale strand of the needle loop, the free end strand having been laid in the process of formation of the bale.

The reciprocating plunger is designated generally 40 and is but shown in general outline in Figure 3, nor is its drive mechanism shown for these form no part of the instant invention, although the operations will be referred to in part in connection with their relationship to the timing and functioning of the tying mechanism.

Figure 6:
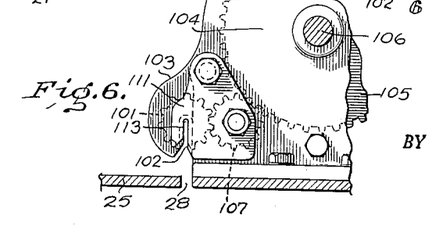
Figure 6 is a detailed elevation of the gearing which drives the twister pinions, a view taken from line 6—6 of Figure 5.

The tying device per se is in this case a wire twisting mechanism. It comprises the normally downwardly presenting slotted twister gear pinion 101 which with the radial strand receiving slot 102 appears in dotted lines in Figures 1 and 3 and in full lines in Figures 4 and 6. There are two of these, one for the right hand tie and one for the left hand side of its bale, for there are as usual two ties made per bale.

Here at the outset it may be said that not only the twist mechanism per se but also the needle mechanism 200 and the strand laying mechanism 800 are in duplicate, one for the right hand tie and one for the left, whereas all the other mechanisms are unitary and commonly serve these three.

The twister mechanism 100 includes housings 103 of the usual form which shroud the gear teeth and also provide journals as necessary for the twister pinions 101. Transverse enlargement and extension 104 of this housing provides bearing support and grease enclosure for main drive gear 105 and intervened idlers 107 through which pinions 101 are driven from gear 105. A longitudinally extending operating shaft 106 mounts and drives gear 105 as well as other parts of the mechanism.

The housing 103 of the gear pinions 101 are slotted in their side walls in alignment with the wire strand receiving slots 102 of the gears, but these slots are sufficiently wide to receive the twisted strands whereas the slots 102 are of a width but sufficient to accommodate the diameter of the wire, thereby to achieve the twist. Flanking housing 103 are the anvil members 111 whose anvil walls 112 are spaced away from the side of the twister pinions 102 a distance to accommodate the completed twist of the strand. Anvil slots 113 in these walls 112 are longitudinally aligned with the slots 102 and 110 of the twister gears and their housings and like the former present downwardly. Like the slots 102 their width is but slightly greater than the diameter of the wire strands so that they prevent rotative movement of the strands while the wire twists are being made. Yet the widths of slots 102 and 113 is such as to afford such tolerance to the diameter of the wires as will permit the double twist joint to fall freely to the side of the bale when completed and released.

Figure 4:
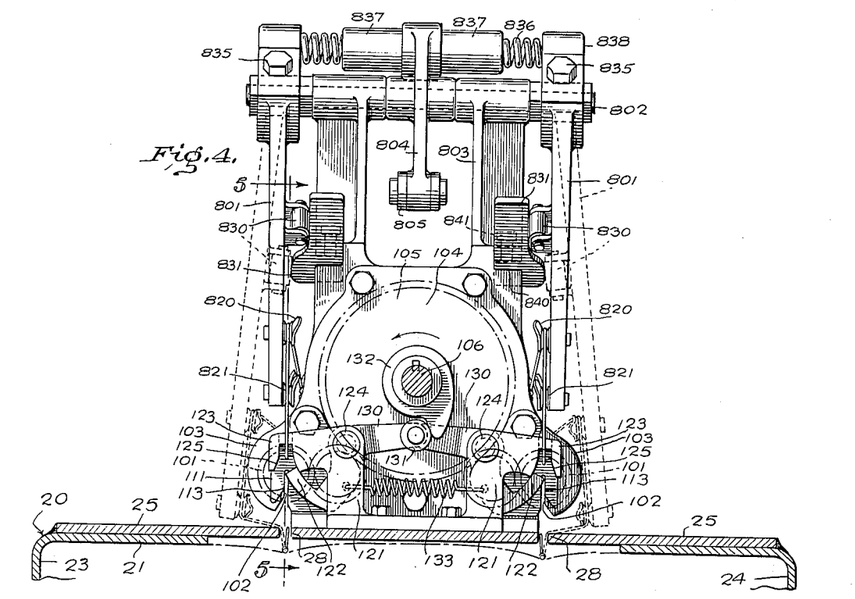
Figure 4 is a transverse elevation from the line 4—4 of Figure 1, showing the upper portion of the bale case in cross-section and showing the upper portion of the bale case in cross-section and showing in full lines the parts in the positions they occupy in Figure 1, but showing in dotted lines the bale strand laying device in one of the positions occupied in the process of laying the bale strand.

The cutters are located along side of the twister gear housings forwardly. They are designated generally 120 and comprise a pair of upstanding mounting arms 121 founded on the base plate 25 and supporting relatively fixed and relatively movable cutter plates 122 and 123 the latter of which is pivoted on an axis 124 borne by the arms 122. The cutting jaws are normally open as shown in Figure 4, opening downwardly into the plane of the bale strand and in substantial alignment with the lay of the bale strand and in substantial alignment with the several wire strand receiving slots in the perimeters of the twister gear, the twister gear housing and the anvils. As appears clearly in Figure 4 the downwardly extending side 125 of the fixed jaw 123 and the entering side walls of each of the strand receiving slots referred to are flared divergingly downwardly, the more certainly to enter and guide the wire strands to the lay positions in which they are to be operated upon by these mechanisms. In the case of the slots associated with the twister pinion, its housing, and its anvils, the lay position is the bottom of the slots. In the case of the cutter mechanism 120 that position is against the fixed jaw 123 and above the movable jaw 122. Only the bale strand of the tie is received by the jaws 122 and 123 for it only is laid in the elevated position of the cutter jaws, while the spool or free end strand as laid by the bale passes below the movable jaws.

The movable jaws 122 are operated from lever extensions 130 through the intermediary of followers 131 which are engaged by cams 132 keyed to the twister operating shaft 106. Followers 131 are borne against cams 132 and retracted by an interconnecting spiral tension spring 133 which hooks into the movable jaws 122 at points below their pivots 124.

Figure 5:
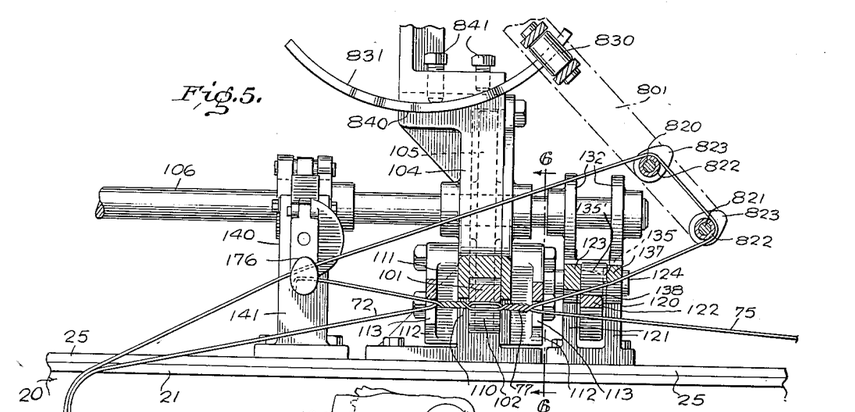
Figure 5 is a partial side elevation with parts in section and in the relative positions they occupy just after the bale strand has been laid over the free end strand and the double twist joint forming the tie has been completed, but before the bale strand has been severed from the spool strand of the loop to form the new free end.

The movable jaws 122 on their forward sides are spaced from the flanking supporting brackets 121 by gaps 135 slightly greater in width than the diameter of the wire strand which is being cut, and this spacing is maintained through appropriate dimension of the mounting boss or hub 135' (see Figure 5). The overhanging portion 137 of the forward bracket arm 121 is given an anvil shape of a cross-section somewhat less than right angular and its near corner is somewhat rounded. The juxtaposed corner of the movable jaw 122 is also rounded as at 138. The two together, the forward rounded corner of the movable jaw 122 and the anvil 137, are so related as to bend the severed end of the needle strand of the loop to the form shown in Figure 13 as the movable jaw 122 is moved upwardly beyond the cutting position, to that position shown in dotted lines, thus deforming the extremity of the wire strand to constitute a stop. When the jaw 122 is retracted the deformed end is released and takes the position shown in Figure 1.

On the opposite side of the twister gear housing and spaced rearwardly therefrom a distance somewhat greater than the cutting mechanism 120 is spaced, is a free end and fixed stop and clamp mechanism 140. This too is bracket mounted from base plate 125 in this case by an upstanding pillar bracket 141. Extending transversely through the upper portion of these brackets 141 and fixed against rotation and lateral movement with respect thereto by keys or equivalent means 142 is a transversely mounted shaft 143 whose ends project in each case outwardly of the brackets 141 and are coarsely threaded as at 144. Threaded on their ends through mounting sleeves 145 are the members 146 of the two jaw free end clamps 146 and 147. Jaw 147 is pivoted to jaw 146 through a hinge joint 148 in such manner that the jaws may be opened and closed by moving 147 about pivot 148 to move its lower end 149 away from the lower end 150 of jaw 146. Jaw 147 is normally held against jaw 146 by a compression and torsion spring 151 whose ends are turned parallel to its axis (which is the axis of the shaft 143 which it surrounds) and thereby placed under torsion tension to bias the clamp at large comprised of jaws 146, 147 clockwise as one looks at Figures 1, 3, 5 and 8. The jaws while closed by spring 151 are opened by interengagement of the upward extension 155 from jaw 147 and a cam sweep 156 borne transversely on axis 157 centered in the upper end of the pillars 141. These sweeps 156 in turn are operated by inward lever extension 158 through the intermediary followers 159 which are engaged respectively by cams 160 carried from the same tying device drive shaft 106 which carries the cams 132 which operate the cutter mechanisms 120. Retracting springs 161 hook to levers 158 between their mounting axes 157 and follower axes 159, and hooked under the clamp mounting shaft 143 serve to retract sweeps 156 after the jaws 147 have been operated.

Figures 9, 10, 15:
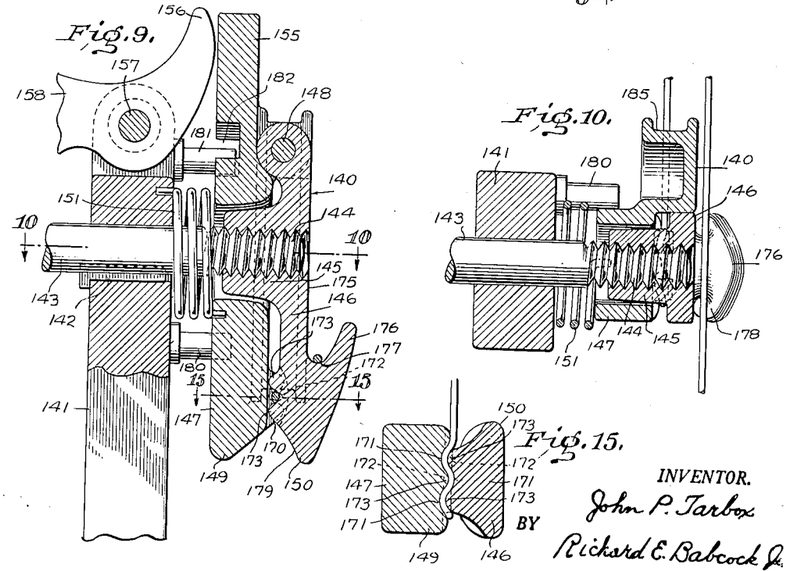
Figure 9 is a vertical section of this device of Figure 8 taken on line 9—9 of that figure.
Figure 10 is a horizontal section of that device taken on line 10—10 of Figure 9.
Figure 15 is a detail cross-section in line 15—15 of Figure 9.

The jaws 146, 147 engage the wire strands between their ends 149 and 150. These ends flare outwardly from their meeting faces 170 whereby a wire strand pressed between them may the more readily part them from each other sufficiently to be received between the meeting faces. These meeting faces are complementally radially grooved as appears in the cross-section of Figure 15 whereby the body of the strand engaged by them is the more effectively clamped against longitudinal passage therethrough. Furthermore, the grooved portions project toward each other from the juxtaposed faces of the jaws 146, 147 and these faces are in turn transversely grooved to receive the longitudinally extending strand in the depth of this transverse grooving. The radial grooves are denominated 171, the transverse grooves 172 and the projecting faces 173. All portions of the flared ends 149, 150 and the transverse grooves 172 are rounded radially the more smoothly to admit the wire strand when pressed between them. However, the radial groovings 171 may be provided with abrupt or even sharp cornered walls if desired, the more strongly to grip the wire strand and resist longitudinal draft of the wire strand socketed in the grooves 172.

The outer face 175 of the outer jaws 146 is provided with an auxiliary downwardly extending hook portion 176, the rounded bottom of which is continued as a groove 178 until it merges into the axially outwardly flared end 150 and surface 179. Thus a strand once engaged in this hook upon a counter-clockwise movement of the clamping jaws 146, 147 about shaft 143 will become transferred by way of the groove 178 to the outwardly flaring surface 179 and by way of this surface and the parting of the jaw end 149 and 150 become seated in the groove 172.

The clamp 140 is limited in angular movement of its jaws to substantially 180° of such movement through the provision of two limiting stops projecting from the outer face of the bracket 141. A lower stop 180 engaging the side of releasable jaw 149 prevents further movement counter-clockwise (having reference to Figures 1, 3 and 8) while an upper stop 181 which during counter-clockwise movement of jaw 147 passes through a slot 182 in jaw 147 limits clockwise movement through engagement with the opposite side of jaw 147. The torsion tension of spring 151 properly adjusted strongly biases the clamp 140 to its extreme clockwise position 180° from the positions of Figures 8 and 9 with jaw 147 against the upper stop 181. However, during the formation of a bale it is held in the position shown in Figures 8 and 9 by the pull of the bale upon the free end strand, the deformed end of the strand, and the spring clamp action of the jaws 146 and 147 under the compression of spring 151 gripping and stopping the extremity from being drawn through the clamp, and the clamp being held thereby against lower stop 180. So soon, however, as the clamp is released by action of sweep 156 against projecting end 155 and the ends 149, 150 are fully parted the extremity is freed entirely from the grip of the clamp, the torsional tension of spring 151 will flip the clamp counter-clockwise through 180°. In so moving, the strand is promptly transferred by way of groove 178 as aforesaid to the flaring face 179 and as the clamp approaches its opposite 180° position the jaws will be parted by the tension in the strand itself and the strand will then enter groove 172 and the jaws close about it. This is the situation illustrated in Figures 1 and 13.

Figure 12:
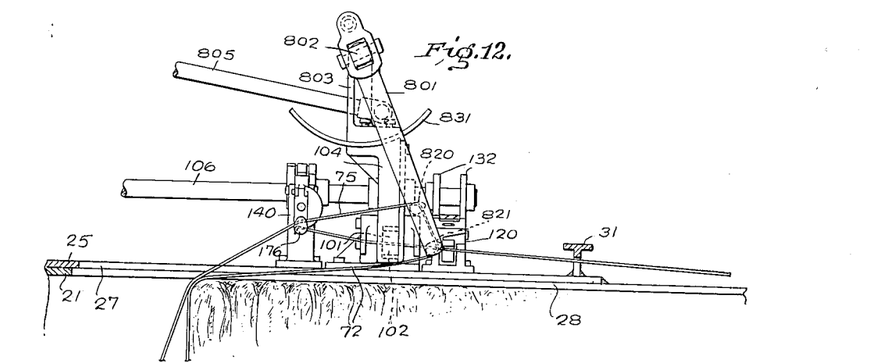
Figure 13:
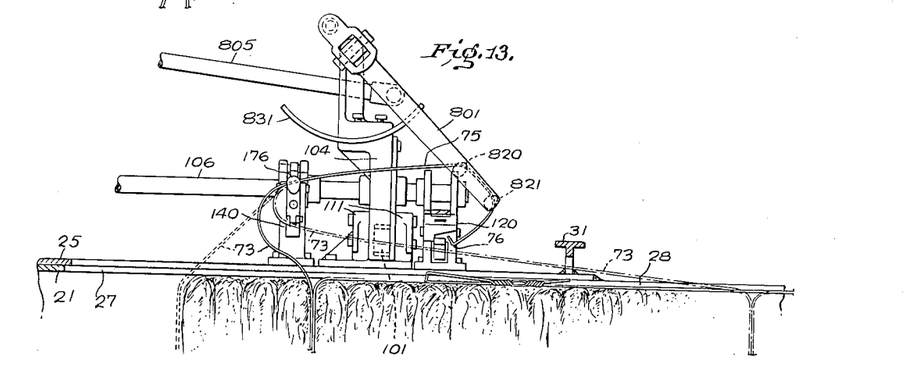

On the side of the jaw 146 clockwise of the jaw pivot 148 is provided a sector 185 centered about the axis of shaft 143 about which the clamp turns and the periphery of which is grooved like a pulley. It is of a radius substantially equal to the radial distance between axis of shaft 143 and the groove 172 which retains the free end so that a strand socketed and clamped in this groove 172 will rest substantially tangent to the bottom of the groove. Thereby a free end strand drawn forward by a bale in process of formation to form the bale loop as shown in Figure 13 will reach and rest in the groove of the sector 185, and as the strand becomes taut will pull on the sector as does a belt upon a pulley, and turn the clamp 140 counter-clockwise until it rechanges position 180° this time against the torsion tension of spring 151 and again to occupy the position shown in Figures 3, 8, 9, 11 and 12. Depending upon the compression tension of spring 151 which presses the jaws 146, 147 together about the strand and the abruptness or sharpness of the radial grooves 171 the drag of the strand as the bale is being formed may or may not be sufficient to overcome the torsional tension of spring 151 and reverse the clamp 140 prior to the ultimate engagement of the deformed end of the strand with the side of the clamp, but in any event it will be sufficient to reverse the position of the clamp as soon as the deformed end abuts the side of the clamp. In either event, as the clamp is moved through the counter-clockwise 180° and in proportion as it is so moved, the very coarse thread 143 being in a counter-clockwise direction results in drawing the entire clamp toward the bracket 141 with resultant increase in compression tension of spring 151, and proportional increase in clamping grip of the jaws upon the free end strand. The combination of this increased grip and abutment of the deformed extremity of the free end, serves to stop and fixedly hold the free end in the position defined by the lower stop 180, and against the maximum tension of the bale loop which builds up as the bale is built up.

The needle mechanism which engages the spool strand blank and projects the needle loop through the bale case to be acted upon by the twisting mechanism 100, comprehends the pair of needles 201 carried from bight 202 of the U-shaped yoke 203 depended from the sides of the casing from yoke axes engaged in bearings 204 at the upper ends of the arms of the yoke 203. The needles have main bodies of conventional form and adjustable mountings 210 upon the bight of the yoke likewise of conventional form, and with the detail of which latter we are not particularly concerned. The points of the needles are provided with a pair of point rollers 211 at the head of an axially outward offset forwardly of the main body to afford access of the strand laying device to the bale strand when the loop has been advanced through the bale case as shown in Figure 3. These needle point rollers are in the plane of the tie to be formed about the bale. They are positioned for engagement with the spool strand by needle point guide 212 borne from the mounting structure 213 of a spool strand guide roller 214, which supporting structure is appropriately anchored to the bottom 22 of the bale case by means not shown.

The primary timing mechanism through the time drive for both the needle mechanism 200 and the twisting or tying mechanism 100 is in a form of one revolution and stop clutch 301 of detailed construction and operation, such as shown in copending application Serial No. 268,424 filed January 26, 1952, by E. B. Nolt and R. R. Eby. The driving element 302 of this clutch is constantly rotated by means of a chain drive 303 which operates in accurately timed relation to the position of the reciprocating plunger 40, the timing being such that the driving element makes one revolution during the period the plunger requires to make one stroke. This is usually attained simply by a 1:1 driving connection between the crankshaft which operates the plunger and the driven element 302. The driven element 304 of this clutch is connectible with the driving element through a detent so positioned that its revolution may be commenced only when the plunger 40 is in or near its extreme forward position whereby it retains the end-most wad of a newly formed bale under compression and in position while the needles are in the bale case. The outer end of this detent 310 is normally engaged by the upper end of a stud 311 projecting radially from a short rockshaft 312 journalled in an extension 313 from the base borne bracket 314 which supports the main bearing 315 of the main timing clutch 301. An upward extending arm 316 is provided on this shaft for rocking it counter-clockwise and so removing radial stud 311 from the path of the outer end 310 of the clutch detent. A spiral spring 317 biases it to a return position. Thus moved counter-clockwise and immediately released, in the interim the outer end 310 of the detent carried by driven member 304 passes beyond its under the drive of the clutch, whereupon the stud 311 again enters the path of the detent end 310 and so to stop the clutch at the end of the single revolution which constitutes its cycle. The detail and operation of such a timing clutch is fully described in the copending application, and need not be repeated here.

The bale length metering mechanism 400 is the means for releasing this primary timing mechanism to bring about the timed operation of the mechanism at large with respect to the movements of the plunger 40. This mechanism 400 comprises as usual a metering wheel 401 mounted on a transverse axis 402 in a vertical plane, and projecting through the open space 29 flanking the bale tension means 30 into engagment with the top of a bale being formed. The length of the perimeter of the metering wheel measured approximately by the pitch of its engaging teeth determines the length of a bale, for each revolution of the metering wheel trips the primary timing clutch 301 just once. This tripping is brought about through a linkage between the metering wheel 401 and the operating lever 310 of the detent retaining stud 311. This linkage comprises a crank 403 on the end of the metering wheel shaft 402 which crank is revolved by the metering wheel and pushes on shoulder 409 of a longitudinally extending bar 404 which is supported slidably in pedestal 403. This bar has a depressed rearward end 405 which has pivotal connection with the upper end of lever 316. When the crank of the metering wheel is revolved through 360° from an extreme rearward to an extreme forward position, and again rearward crank 403 engages shoulder 409 and moves shaft 312 and stud 311 counter-clockwise to release detent 310. Immediately, however, the driven member advances substantially on its revolution the under reaching end 411 of lever 410 engages the underside of bar 404 and lifts the shoulder 409 above crank 403, and permits bar 404 to be returned to its normal position, under the urge of a spring 415 which connects its main body with pedestal 408. Stud 311 is therefore returned to the path of the detent 310 to stop the clutch at the end of its single revolution. Lever 410 is operated by a link connection 414 to offset 413 on the needle yoke 203, lever 410 being journaled at 412 in pedestal 408.

Coacting with the timing mechanism 300 and the metering mechanism 400 which controls it is the plunger latch mechanism 500 which serves to check the reciprocation of the plunger 40 for one stroke and afford the needle 201 time to project the needle loop through the bale case into the range of the tying mechanism 100 and then to be retracted. This plunger latch mechanism appears in part in Figures 1, 2, and 3, and substantially in whole in the sectional elevation in Figure 14. It comprises the plunger latch 501 per se pivoted in upstanding bracket 501 secured to the base or top of the bale case and having its fore-end undercut at 503 jointly for the purpose of forming a shoulder 504 to engage the rear end 41 of the plunger as shown in Figure 3 and a fore-end 503 to rest on top of the base case and limit its downward movement the body of latch being projected through an aperture 505 to effect this engagement. The latch is controlled and operated from an unstanding bell crank extension 510, the upper end of which is slidably connected with the upper end of a lever 512 operated from shaft 513 borne in bearing brackets 514 supported from the bale case by a crank arm 515 whose cam follower 516 (see Figures 1 and 2 especially) is engaged with the periphery of cam disk 517 driven from through-shaft 320 of timing mechanism 301 and therefore subject to a one revolution and stop movement when driven member 304 connected with it is rotated one revolution by driving member 301. A retracting spring 520 acting on arm 521 welded to the same shaft 513 to which levers 512 and 515 are connected serves to bias shaft 513 counter-clockwise and retain cam follower 516 against the periphery of the cam disk 517, where when shaft 320 is at rest the follower 516 rests in notch 521. In this situation the arm 512 presses against an abutment 522 on rod 511 and keeps the latch 501 raised against the tension of a spring 523 which interconnects extension 510 of the latch with an upstanding relatively fixed arm 524. When cam disk 517 is rotated counter-clockwise, as it is during the operation of the timing mechanism, follower 516 leaves the notch and rides on the otherwise circular periphery, thereby rocking shaft 513 clockwise to carry lever 512 in the same direction, thereby removing its upper end from the abutment 522 and permitting rod 511 to move forwardly under the urge of spring 523 and the latch 501 to be urged into engagement with the rear end of the plunger. Special tension is applied to the spring 523 through a pivotal movement forwardly of lever 524 brought about through engagement of roller 530 carried by its bell crank rearward extension 531 with the top surface of plunger 40 as illustrated in Figure 3, whereby the bottom of the latch is promptly brought against the top of the plunger, so soon as the rear edge 41 of the plunger has moved forwardly past the shoulder 504 and the latch is drawn down and so locks the plunger against rearward movement during the period of such engagement. A breakable coupling connection between the operating crank and the plunger admits of this as well known in the art.

Upon completion of the ensuing revolution of the plunger the crank is again drivingly latched to the plunger and in the mean time shaft 320 having completed its revolution, follower 516 again drops into notch 521 in cam disk 517, permitting retracting spring 520 to abruptly rock shaft 513 and through lever 512 abutment 522 and rod 511, to lift latch 501 out of the bale case and so release the plunger 40 which is automatically encoupled with its driving crank for its succeeding reciprocations to form the next bale.

The needle drive mechanism 600 consists of a pair of cranks 601, one connected with each of the laterally projecting ends of the timer shaft 320, of pitmans 601 interconnecting these cranks with cranks 603 respectively rigidly connected with the upper ends 604 of the needle bearing yoke 203 about their pivotal connections 204 with the sides of the bale case. Through this mechanism 600 the needle yoke 200 and the needles 201 which it bears are reciprocated once each time timer shaft 320 is revolved once, whereby to project needles 201 through the bale case to deliver the needle loop to the twister mechanism 100 and thereupon to retract them.

The secondary timing mechanism 700 which drives tying device 100 is not connected directly with the driven member 304 of the primary timing mechanism 300 as is the timing shaft 320. Instead it has its own clutch connection 701 with the driving member 301 of the primary mechanism. This connection is however under control of the timing mechanism 300 in such manner that the timing cycle of the secondary is dependent upon the primary and immediately follows it. The clutch 701 is of the friction disk type, the torque of which is developed through engagement of a driving friction disk 702, connected to and constantly rotating with the driving member 301 and the timing mechanism and which friction disk 702 is constantly yieldingly pressed against driven friction disk 703 by a series of intervening spiral springs 704 appropriately socketed between an axially fixed spring anchor flange 705 and the relatively axially movable friction disk flange 702. (See copending application above referred to for details of the relationship between the primary mechanism 300 and the secondary mechanism 701.) Appropriate friction linings being provided between the relatively movable clutch disk 702 and 703, member 703 may be driven frictionally by member 702. Member 703 is journaled freely on shaft 320 in a manner to admit of this. However, its rotation is normally prevented by the head of retaining dog 710 on a shaft 711 borne in brackets 712 anchored to the base plate 25 and bearing against the underside of a lug 713 projecting from the driven disk 703. Rocking of shaft 711 counter-clockwise will carry the dog 710 out from underneath the lug 713 and permit driven member 703 to be rotated by the driving member 701 of the clutch. Such release movement of shaft 711 is brought about by the engagement of follower 720 on rock lever 721 carried by shaft 711 by the arm 722 of a cam 723 projected from the inner face of cam disk 517. So soon as the projecting cam 722 passes counter-clockwise beyond follower 720 the follower is snapped back to its original position under the urge of spring 520 which reacts against arm 521 of shaft 513. One and the same tension spring by reason of its drawing together of arms 521 and 721 serves commonly to retract both shafts. Dog 710 is therefore re-entered upon the path of lug 713 shortly after lug 713 passes it upon the initiation of the cycle of revolution of this secondary mechanism and clutch disk 703 is therefore brought to rest after completing but one revolution.

Driven member 703 revolves the one to one bevel gears 730 and thereby rotates driving shaft 106 journaled from mounting plate 25 in bearing 731 and driving the tying devices per se 100.

Also operated from the primary timing mechanism 300 is the needle loop extending and strand laying mechanism 800. This consists of the pair of oscillable loop extending and strand laying arms 801 which depends from overhead axis 802 supported by an extension 803 from the top of the main gear housing 104 of the twister mechanism 100. These arms 801 are oscillated by a single pitman 805 which is reciprocated from the upper end of the arm 806 of a bell crank lever 806, 807 rockably borne upon a rock shaft 808 journaled in a transverse extension 809 from the upper side of the bearing 731 which journals shaft 320. Thus the arms 801 normally in the forward position shown in Figure 1 when the mechanism is at rest, when shaft 320 makes its revolution, are moved rearwardly to meet and engage the needle loops and then forwardly to extend the needle loops as a lay loop to draw the strands and make the lays for the ties and again come to rest in their normal positions.

The arms effect a two point engagement with the needle loop by means of two so-called hoops 820 and 821 spaced radially apart on the lengths of the arms 801. They are spaced apart a distance sufficient to bear the lower strand, the bale strand of the loop, on a path extending downwardly to a level below the twister pinion 101 and the associated parts of tying device 100 as the arm sweeps forwardly while bearing the upper or spool strand of the loop which is to constitute the next free end strand on a path above the tying device 100. Opposite the free end clamp 140 the paths of movement of hooks 820 and 821 are such as to lead the bale strand of the loop below the hook 176 of the free end clamp while it leads the spool strand above the hook 176 and as travel continues lays it in the hook 176. The hooks 820 and 821 embody the usual rollers 822 to cut down friction as the loop is extended and the usual tongues 823 to hook over the bale strand of the middle loop while the needle is in its extreme upper position whereby to seat the bight of the loop upon the rollers and enable it to be forwardly as the arms 801 are moved forwardly.

The strand laying movement of the arms is a compound one, comprised not only of the arcuate travel of the hooks 820 and 821, but also of a lateral movement of the arms brought about by the engagement of cam followers 830 borne on the inner face of the arms and in turn bearing upon arcuate cams 831 centered upon the axis 802 of the arms to impart to the arms this lateral movement. The arms are transversely pivoted at 835 transaxially of their principal axis of oscillation 802. Spiral compression spring 836 bearing between bosses 837 in extension of the arm operating crank 804 and coextensive extensions 838 of arms 801 serve to bias the arms toward each other and retain their followers in engagement with the cams 831 during the entire oscillatory movement thereof. In the position of rest forwardly, hooks 820 and 821 lie in the vertical plane of the lays in the tying device 100. The contour of the cam 831 is such that when arms are oscillated rearwardly to engage the needle loop the hooks 820 and 821 follow paths in the vertical plane of the lays, but as the arms approach the tying device 100 the hook paths are diverted abruptly outwardly to circumvent the tying device, then abruptly inwardly as the tying device is passed to place said hooks in the plane of the hook 176, and once again inwardly to establish the paths of movement in the plane of the needle loop whereby as the hooks reach and pass into the loop their tongues 823 ratchet past the bale strand of the loop and so engage with it.

Upon the return oscillation forwardly, the paths of the hooks are retraced. The hooks first move outwardly to the plane of the hook 176, to lay the spool strand over the top of the hook, the bale strand passing below it, then outwardly again to bypass the tying device 100 with the lower strand at a level between the bottom of the tying device and the bale case 1 and thereafter abruptly as the tying device is passed toward and into the plane of the lays, wherein as the arc of travel of the lower hook 821 reaches higher and higher (the parts of both hooks are on arcs about axis 802), the bale strand is pulled up into the downwardly open slots of the tying device and laid ready for the tying. The cam 831 which brings about the movement is longitudinally and laterally adjustable and removably mounted in a slot 840 in a lateral extension of the main gear housing 104, and is held therein and in adjusted positions by set screws 841.

*Operation*

Let us assume that an advanced bale 50 has been completed and that its tying is finished. Such a bale is then ready to be progressively advanced to the delivery end of the casing by the progressive formation of the succeeding bale. In such case the wire 70 from the coil (not shown) has been drawn over the guide roller 214 associated with the needle guide 215 at the bottom of the bale case 20, jointly by the initial needle loop forming action of needle 201 and the strand laying action of arm 801 of the strand laying mechanism 800 to form the first wire length to enter upon the tie of the next succeeeding bale. This length is comprised first of the spool strand 73 leading from roller 214 through the bale case to the upper corner 51 of the advance bale and around that corner and into the jaws 146, 147 of the free end clamp and stop 140 where it rests and is relatively loosely gripped in retaining groove 172 (see Figs. 8 and 9 as well as Fig. 1). Second, and in continuation of strand 73 from clamp 140 there is the new free end strand 75 which extends around upper and lower hooks 820 and 821 borne by arm 801 of the strand laying mechanism 800 and to the cutting mechanism 120, where the severed extremity 76 has been deformed by sharply bending it at substantially right angles to the main body during the operation which severed it from the newly completed double twist joint tie 77.

If this operation of threading the mechanism for a tie had been required to be done by hand, as is the case when wires are broken or when an automatic baler is to be threaded for the first time from a fresh coil, wire 70 from the coil would be thrust by hand through the bale case in sufficient length to constitute the spool strand 73 and the free end strand 75, and its extremity bent with a pair of pliers to deform it. Then with extremity 76 placed at the deforming anvil member 137 of the cutting mechanism 120 (see Fig. 5) it would be led through hooks 821, 820 in succession and rearwardly through groove 172 of the jaws of cutter 140, whereupon all of the reaches of both strands 73 and 75 would be drawn taut, the extremity 76 being retained opposite the anvil jaws. Alternatively, strand 73 would be pulled taut through the jaws of free end clamp 140, thereafter 75 pulled taut around hooks 820 and 821, then deformed opposite anvil 137 and the excess beyond the deformed point allowed to remain if not too great or cut off if judged too great.

Figure 1:
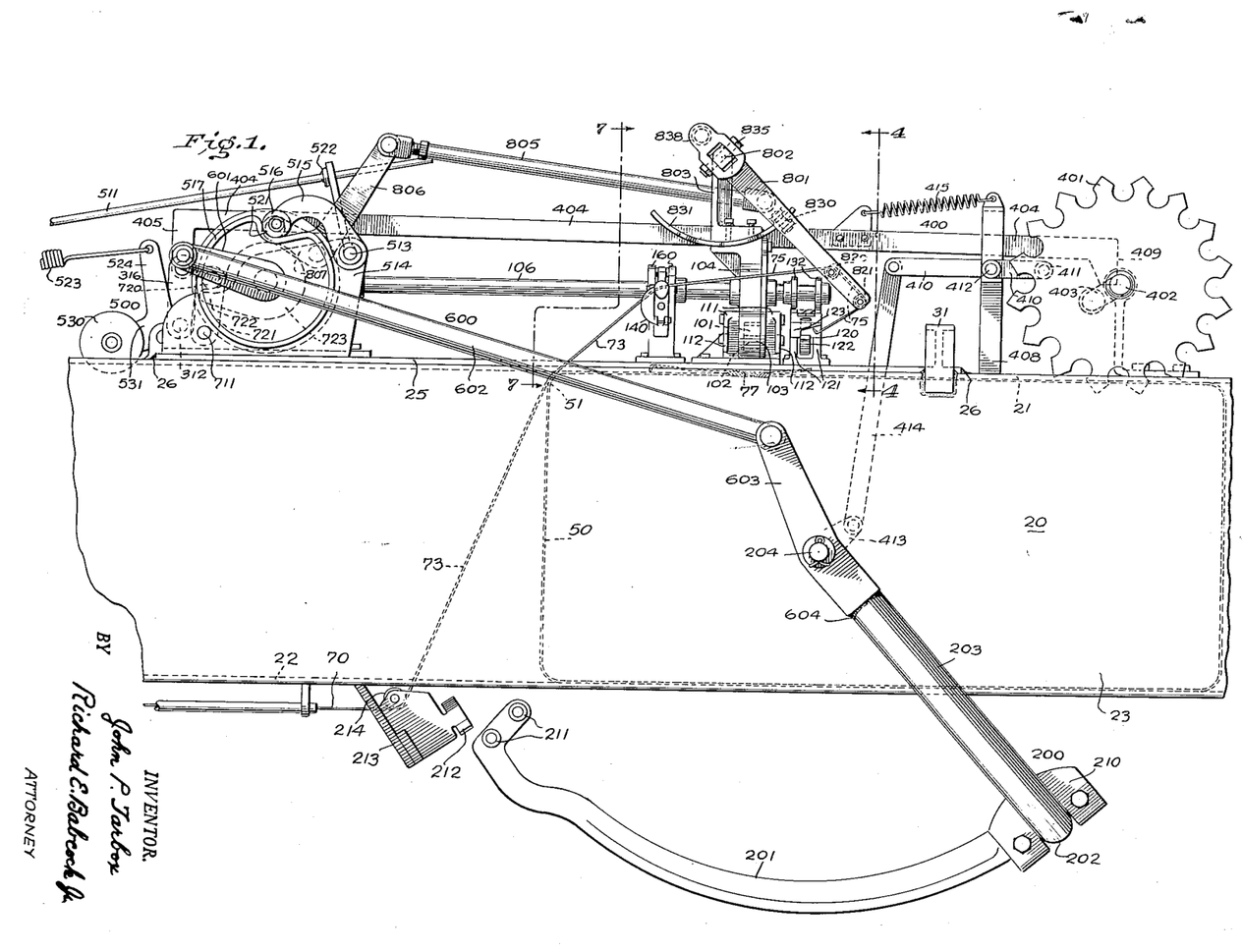
Figure 1 is a side elevation of this mechanism with the parts shown in the positions they occupy just as the advance or forward bale (that on the right) has been completed and the tie about it been made, and just as a new bale is about to be commenced. All parts of the mechanism are therefore idle until the next succeeding bale is completed or is nearing completion.

So threaded and ready for the starting of a new bale, all parts of the mechanism are at rest in the position shown in Fig. 1. Except for step by step revolution of the metering wheel 401 as the new bale grows wad by wad the parts remain at rest until the new bale nears or reaches completion. As shown in Figure 1, the crank arm 402 of the metering wheel is in that rearward position which it occupied just after completing its advance of push bar 401. During its forward movement on the ensuing half revolution it retracts bar 404 and places the shoulder 405 depending from the rearward end of this bar behind the upper end of the lever 316 controlling the position of the detent stop arm 311 which governs the detent 310 and the engagement of driving and driven members 301, 304 of the primary timing mechanism 300.

Assuming now the next succeeding bale is nearly complete, metering wheel 401 as it completes its revolution moves crank 402 counter-clockwise engaging crank 403 with the end shoulder 409 of push bar 404 and so releasing detent 310 for a single revolution of a primary timing mechanism 300. Immediately the needles 201 are projected upwardly through the bale case and simultaneously arms 801 are oscillated rearwardly to enable the hooks 820 and 821 to engage with the bale strand 72 of the needle loop 70 which is presented by the needle as it reaches near the extreme upper limit of its movement. This relation of parts is clearly depicted in the elevation of Figure 3. Needles 201 reach their extremes of movement when the primary timing device 300 has achieved one-half of its revolution and cranks 601 are 180 degrees from their starting position. Arms 801 in traveling to the rearward position shown were guided by means of cams 831 to carry hooks 820, 821 on the paths above outlined first in the plane of the lays in the tying device 100 when as they near the device 100 extending laterally outwardly to clear the tying device, once past the mechanism rearwardly extending abruptly inwardly to place the hooks in the plane of hook 176 of clamp 140 and passing it to the plane of the needle loop 70 as shown in Figure 3. As the hooks 820 and 821 passed hook 176 of the free end clamp 140, one of them 820, passed above it and the other 821, below it.

The shape of the slotted cam 816 which controls the movements of arm 801 from primary timer shaft 320 is such, and the upper extreme of movement of needles 201 is of such elevation as to enable the hooks 820 and 821 to ratchet past the bale strand 72 of the loop and then forwardly once again as arm 801 reverses its oscillation to remove the hooks out of the path of the needle, while the point rollers 211 of the needle move in the uppermost range of their travel, above the upper hook 820. In other words cam 816 is intended to be given that degree of abruptness which will insure the entrance into the loop of hooks 820 and 821 and their departure therefrom with bale strand 72 during the time period the point of the needle approaches to and recedes from its upper extreme of movement in that region of its travel which lies wholly above the uppermost hook 820, when within the needle loop. Both the upper extreme of movement of the needle point and the cam 815 can be relatively adjusted to assure such clearance of needles 201 and arms 801 as are desired.

Figure 11:
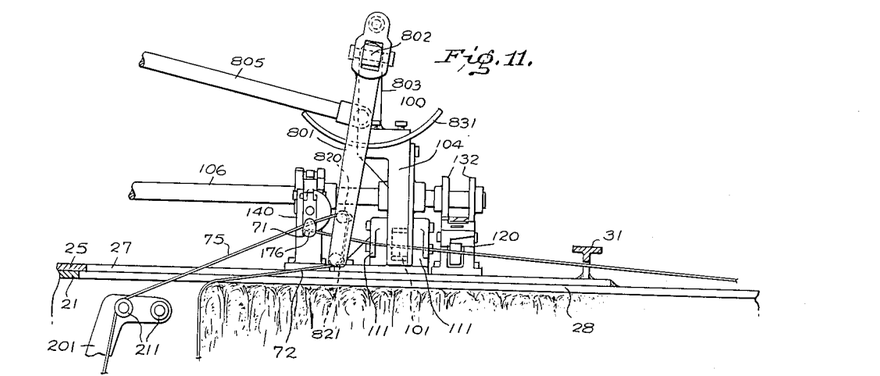

Hooks 820 having cleared the point of the needle, on the ensuing forward oscillation of arms 801, bearing the bale strand 72 by the two spaced points of engagement extend the needle loop forwardly as the needles 201 recede as shown in Figure 11, timing device 300 proceeding on the second 180 degrees of its revolution. The movement of hooks 820 and 821 past the free end clamp 140 engages the new free end strands 75 being formed with the clamp by laying it over and into the outwardly projecting hook 176 as hook 820 passes over and beyond it in its plane. The while the bale strand 72 of the extended loop is carried forward on the lower path by the hook 821.

The forward laying movement progressing, as the hooks 820 and 821 approach the tying device 100 the cams 831 swing the arms 801 laterally outwardly to carry the hooks clear of tying device 100, this time carrying the bight 71 with them and trailing the bale strand 72 and the free end strand 75 around the outside, the free end strands 75 the while remaining in and drawing through the hooks 176. This operation is shown in Figure 12. At this juncture cams 831 return arms 801 abruptly inwardly to once more carry the paths of the hooks 820, 821 into the planes of the lays of the tying device thus sweeping the strands 75 and 72 into that plane, which plane is the plane in which are located the perimetral access slots 102 of the twister pinions 101 and related elements of the tying device 100 to their lay engaging interiors.

These slots present toward the bale side and as arms 801 move to their extreme forward positions, those indicated in Figures 4 and 5 in full lines, strand 72 is raised fully into lay engagement with the several parts of the tying device the mating and already laid free end strand 75 and ready for the twist. The twist ensues immediately that the needles 201 and the arms 801 are brought to their extreme retracted positions by the close of the one revolution cycle of the primary timer 300. Stopping of the timer 300 at one revolution, it will be remembered, is preestablished by the lifting of push bar 404 as the needles are projected through the bale case so resulting in replacement of stop 311 in the path of detent end 310.

Plunger lockout latch 501 is lifted as this revolution closes, and plunger 40, once more coupled to its drive, is free to take its first stroke toward the formation of the next succeeding bale. Unlatching 501 is brought about by the dropping of follower 516 once more into the receiving depression 521 in cam 517.

The tying is brought about at this juncture by the secondary timing through the engagement of cam lug 722 and cam follower 720 (see Fig. 1) and the ensuing rocking of stop 710 out from under lug 713 of the secondary clutch 701, 702 as the cycle of timer 300 closes. This clutch immediately undertakes and completes its revolution and is in turn stopped at its close by reason of the restoration of stop 710 in the path of lug 713 immediately after cam 722 passes follower 720.

The twisting of the wires to form tie 77 is brought about as usual through the rotation of the twister pinions 101, through the train of gears extending to the pinions from the twister drive clutch 701 and including the twister drive shaft 106.

This same drive shaft 106, just as the last twist is being completed brings its cams 132 into action upon followers 131 of the cutting mechanisms 120. Strands 72 are laid between the cutters, as shown in Figures 4 and 5, at the same time that they are laid in gear slots 102, and the twisted joints 77 nearing completion, these strands are in position to be cut and it is time for them to be cut. Cams 132 passing followers 131 as shown in Figure 4, depress the followers thus raising the movable jaws 122 into coaction with the fixed jaws 123 and anvils 137, first to sever and then to deform the strands, as shown in the transition from the full line to the dotted line position of the cutting mechanism parts depicted in Figure 5. Immediately following the extremities of the new free end strands 75 so formed take the attitude shown in Figure 13, springing away from the anvils.

In Figure 13 the twisted tie 77 which completes a loop about the bale is shown as freed from the twister mechanism 100 and dropped to the side of the bale and the completed bale as progressed by the first wad of the next bale one step toward delivery. Before the tie 77 can be dropped however, and before the new wad is introduced, not only must its bale strand be cut loose as above described, but also the extremity 76 of its free end strand held in clamp 140 until the tie is complete, must be released from the clamp. This release like the cut is also brought about by the last few degrees of revolution of tying device 100.

Figure 7:
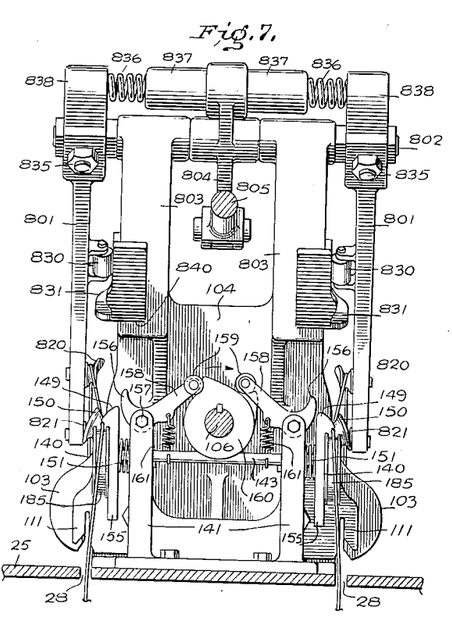
Figure 7 is another sectional elevation, this time from line 7—7 looking forwardly in Figure 1, that is to say looking in the direction of bale formation and delivery, the parts again as in the case of Figure 4 being shown in the relationship they occupy in Figure 1.
Figure 8:
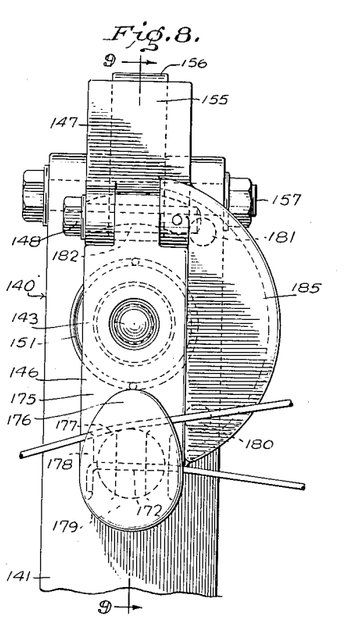
Figure 8 is an enlarged side elevation of the free end stop and clamping device engaged and operated by the free end strand and the formed extremity of that strand.

Referring to Figure 7 which is a view complemental to Figure 4, looking at the opposite end of the twister mechanism from Figure 4, it will be seen that cams 160, carried by shaft 106, are just about to engage followers 159 and so press the camming ends 156 of levers 158 against the upwardly extending ends 155 of the jaws 147 of the free end clamps 140, so to open wide the jaws 146, 147 and drop the strand extremities 76 therefrom. This takes place preferably substantially simultaneously with the cutting and deforming of the new extremity 76 as just now described, so freeing the tie 77 to drop to the side of the bale as shown in Figure 13. This occurs almost the last thing before the secondary clutch 701 comes to a stop.

The moment the extremities 76 are freed from the free end clamps 140 the torsion springs 151 throw these clamps clockwise raising the bodies of the free end strands 75 under the moderate spool and carrying them progressively from the hollows of hooks 176 around the grooves 178 in the face of the hook and into the mouths of the clamps, where the tension in the spool strands 70 drawing on the free ends 75 presses them respectively between the jaws and into the grooves 172 of the respective free end clamps just as they in their clockwise movement approach and finally come to rest against the clockwise stops 181. This action can best be followed by reference to Figures 8, 9 and 10. Figure 13 shows a free end clamp in this rest position. In such position it has come to grips with a new free end strand 75 which was formerly held only in the hollow of hook 176. This takes place preferably before the cutter releases the deformed extremity 77.

The bale commenced with one wad as shown in Figure 13 soon progresses to several wads in length. As it progresses it draws the spool strands 73 about the forward end of the new bale and soon shortens the upper extent of this strand adjoining clamp 140 until it becomes taut and takes the dotted line position shown to the right of the full line position and so carries the new free end strand into receiving slots 102, 110, 112 of the tying mechanism. Thereafter each additional wad pulls upon the free end strand 75 and draws it through the groove 172 of the free end clamp 140 until the deformed extremity 76, having left both hooks 821 and 820, reaches and abuts the near side of the jaws 146, 147, whereupon the deformed end 76 prevents further slipping of the strand through the groove 172. At this juncture, if not before, by reason of the strand gripping action of the clamps, the engagement of the body of the strand 75 in the grooved periphery of the sector 185 (see Figures 8, 9 and 10 once again) rotates the free end clamp 140 counter-clockwise until it fetches up against the counter-clockwise stop 180. The counter-clockwise rotation as heretofore explained, tightens the grip of the jaws upon the extremities of the strands, as rotation proceeds and between the tightened grip and the deformed ends they are firmly held against the further tension set up during the completion of the bale. Upon completion of the bale they are still so held as can be seen by reference to Figure 3, where free end strands 75 stretch taut from clamp 140 in its counter-clockwise position to the advanced end of the now finished bale. Once again, therefore, the mechanism is ready for a tying operation, and as heretofore explained, Figure 3 illustrates the inception of this operation.

Attention is called to the almost elemental simplicity of this tying mechanism. It consists of relatively few parts, no elaborate tracks and guides are used, no countershafts, both the needle and the tying mechanisms are directly operated from their respective primary and secondary timing mechanisms, the parts of the several mechanisms and devices are simple and sturdy, the control of timing is direct and rugged, and no bale case clamping is required. The means forming the bale effects the lay in the tying device of the free end strand through the bale formation leaving to the strand laying mechanism per se the lay of the bale strand only. There are used a minimum of strand guiding devices, only the sturdy cams 831 and the sturdy hooks 176. Economical manufacture, reliable operation and long durability are the results.

The annexed claims are intended to cover not only the particular embodiment of my invention, the subject of this application, but all other embodiments in which its generic spirit may be found.

I claim:

1. In a hay baler of the class in which bales of hay are formed in and moved longitudinally through a bale case, the combination with said bale case of strand tying mechanism comprising a twister having a radial slot and means mounting same on the bale case for rotation about an axis parallel to the longitudinal axis of the bale case, said twister normally being at rest in a position wherein its radial slot opens toward the bale case, means for continuously rotating the twister a plurality of complete revolutions during each of its tying cycles and bringing it to rest in said position, needle means movably supported on the bale case for projecting a strand loop around an end of a bale in said case to a delivery point in substantial longitudinal alignment with said twister, and strand laying means mounted on said bale case for moving one strand of said loop from said delivery point between the bale case and twister and into the twister slot.

2. In a hay baler of the class in which bales of hay are formed in and moved longitudinally through a bale case, the combination with said bale case of strand tying mechanism comprising a twister having a radial slot and means mounting same on the bale case for rotation about an axis parallel to the longitudinal axis of the bale case, said twister normally being at rest in a position wherein its radial slot opens toward the bale case, means for continuously rotating the twister a plurality of complete revolutions during each of its tying cycles and bringing it to rest in said position, needle means moveably mounted on the bale case for projecting a strand loop around an end of a bale in said case to a delivery point in substantial longitudinal alignment with said twister, strand laying means pivoted on the bale case for swinging movement about an axis transverse to the twister axis and located on the opposite side of the twister axis from the bale case, and strand engaging means carried by said strand laying means for movement in an arc lying between the twister and the bale case.

3. In a hay baler of the class in which bales of hay are formed and moved longitudinally through a bale case, the combination with said bale case of strand tying mechanism comprising a twister having a radial slot and means mounting same on the bale case for rotation about an axis parallel to the longitudinal axis of the bale case, said twister normally being at rest in a position wherein its radial slot opens toward the bale case, means for continuously rotating the twister a plurality of complete revolutions during each of its tying cycles and bringing it to rest in said position, needle means moveably supported on the bale case for projecting a strand loop around an end of a bale in said case to a delivery point in substantial longitudinal alignment with said twister, and strand laying means mounted on said bale case for moving one strand of said loop from said delivery point between the bale case and twister and into the twister slot, said strand laying means including means for engaging and maintaining the strands of the loop in spaced relation, whereby only said one strand will be moved into the twister slot.

4. In a hay baler of the class in which bales of hay are formed in and moved longitudinally through a bale case, the combination with said bale case of strand tying mechanism comprising a twister having a radial slot and means mounting same on the bale case for rotation about an axis parallel to the longitudinal axis of the bale case, said twister normally being at rest in a position wherein its radial slot opens toward the bale case, means for continuously rotating the twister a plurality of revolutions during each of its tying cycles and bringing it to rest in said position at the conclusion of the tying cycle, needle means moveably supported on the bale case for projecting a strand loop around an end of a bale in said case to a delivery point in substantial longitudinal alignment with said twister, a free end clamp longitudinally aligned with said twister slot between said delivery point and the twister, strand laying means mounted on said bale case for taking said loop from the means and laying opposite sides thereof in said clamp and said twister slot respectively, and means for cutting said loop between the twister and the clamp, the longitudinal alignment of said clamp and said twister causing the longitudinal bale movement to lay one side of said loop in the twister slot.

5. A mechanism according to claim 1 in which the path of movement of the strand laying means is cam controlled to circumvent the tying device in its passage from the one side to the opposite side.

6. A mechanism according to claim 1 in which the path of movement of the strand laying means circumvents the tying device when at its lower level, a cam having a longitudinal and lateral range of adjustment guiding said laying means upon its path and means for supporting said cam throughout such range of adjustment.

7. A mechanism according to claim 1 in which a primary timing mechanism drives the laying means through an actuating cam controlling the extent of its path and its rate of movement on that path.

8. A mechanism according to claim 1 together with a primary timing mechanism, a crank rotated by said timing mechanism and driving the needle means, and a cam rotated by said timing mechanism and driving said strand laying means.

9. A mechanism according to claim 1 together with primary and secondary timing mechanism having successive and independent cycles of movement, means to drive the needle and laying means from said primary mechanism, and means to drive the twister from the secondary mechanism.

10. A mechanism according to claim 2 in which the strand laying means is comprised of an arm oscillable about said transverse axis.

11. A mechanism according to claim 2 in which the strand laying means is comprised of an arm oscillable about an axis, said axis being located longitudinally between the twister and said delivery point.

12. A mechanism according to claim 1 in which the strand laying means is reciprocable on its path.

13. A mechanism according to claim 2 in which the strand laying means comprises a pivoted arm oscillable in two planes, one substantially parallel to the radial slot of said twister and the other at an angle thereto, whereby the arm may circumvent the twister.

14. A mechanism according to claim 2 in which the strand laying means comprises a cam guided oscillable arm spring pressed against its cam, and a cam for guiding said arm, the cam being shaped to move the arm out of and into parallelism with the plane of the radial twister slot thereby to circumvent the twister.

15. A mechanism according to claim 1 together with a free end clamp in the plane of said slot and between the said loop and the twister, and in which mechanism the path of the strand laying means circumvents the main body of said clamp.

16. A mechanism according to claim 2 together with a free end clamp located between the said delivery point and the twister, and in which mechanism the strand laying means comprises an arm oscillable parallel to the plane of the twister slot along a part of its path but at an angle to said plane in the region of said clamp to avoid fouling of its main body.

17. A mechanism according to claim 1 together with a relatively fixed free end strand clamp in the plane of the twister slot and on the rearward side of the tying device, and in which the strand laying means is provided with means placing the other strand of said loop in position to be gripped by the clamp incident to its said movement.

18. A mechanism according to claim 3 in which the strand laying means is provided with a pair of spaced strand engaging hooks effecting engagement with the needle loop.

19. A mechanism according to claim 3 in which the strand laying means is provided with a pair of hooks effecting engagement with the needle loop, one of said hooks lying always wholly above said tying device.

20. A mechanism according to claim 3 in which the strand laying device is provided with a pair of spaced hooks effecting engagement with the needle loop and which spaced hooks between them establish a strand laying loop the bight of which is passed around said tying device from the loop side to the opposite side.

21. A mechanism according to claim 3 in which the engagement of the strand laying means with the needle loop is effected by two spaced hooks whose spacing is retained as they travel from one side of the tying device to the other, so developing a laying loop, together with a cutter located forward of the tying device and engaging the laying loop to sever the same.

22. A mechanism according to claim 3 in which a relatively fixed free end clamp is located in the plane of the lays between the tying device and the needle loop and is provided with means engaging it with the strand created by the upper of said strand laying means during its travel on said path.

23. A mechanism according to claim 3 in which a free end clamp is located in the plane of the lays and in substantial alignment with the free end strand lay between the tying device and the needle loop and provided with means engaging it with the upper of the strands carried forward by the said spaced laying means, together with a cutter forward of said tying device which severs the lower from the upper of said strands, and means thereupon converting the initial engagement of the clamp with the upper strand into strand terminal fixing engagement.

24. A mechanism according to claim 3 together with a shiftable free end terminal clamp which is connected with the upper of the two strands carried forward by said spaced strand laying means during the travel of said means, means to cut the two strands apart and create a free end terminal, and means to shift the clamp to bring the terminal into adjacency to the rear of the tying device as a new bale is formed.

25. A mechanism according to claim 3 together with a free end terminal clamp in the plane of the lays, in which said clamp is shiftable from an intitial free end strand engaging position to a fixed stop position and is provided with jaws having a terminal grip fixing the terminal against dislodgement under full bale tie tension, means initially engaging said clamp with the upper of the strands carried forward by said strand laying means, means providing the strand with a terminal to be fixed by said clamp, and means to shift the clamp to its fixed stop, and into fixing engagement with the terminal.

26. A mechanism according to claim 3 together with a free end strand clamp located between the needle loop and the tying device and having open lipped jaws, which clamp is shiftable from a position in which said jaws are in substantial alignment with the lay of a free end strand in said tying device to a position in which they are above it, which clamp is provided with means engaging the upper of the two strands carried forward by said strand laying means and leading the engaged strands into the open lips of said jaws when the clamp position is shifted as aforesaid.

27. A mechanism according to claim 4 including a terminal forming device which acts on the strand, and the clamp is provided with strand terminal engaging means whch fixes the terminal in position against the tension developed in the strand by the completion of the bale.

28. A mechanism according to claim 4 in which the clamp is shiftable from an initial clamping position in which its engaging jaws are out of line with the lay of the free end strand in the tying device to a position in which they are substantially in line with that lay, together with means to engage the jaws with the strand, and means drawing on the strand to effect the shifting and achieve the lay.

29. A mechanism according to claim 4 in which the clamp is shiftable from one position, in which the strand is initially engaged with it, to a position in which it encounters a fixed stop and in which its jaws are near to the upper reach of the lay of a free end strand in the tying device, and provided with a hook in which the initial engagement is effected and having a grooved lead into its jaws which is followed by the strand as the clamp is shifted to effect jaw grip upon the strand.

30. A mechanism according to claim 4 together with strand terminal forming means forward of the tying device and clamp releasing means rearward thereof, primary and secondary timing means, driving and timing connections from the primary means for the needle and strand laying means, operating connections for the secondary means for the tying device with the terminal forming, and the clamp releasing means.

31. A mechanism according to claim 4 together with strand terminal forming means forward of the tying device and clamp releasing means rearward thereof, primary and secondary timing means, driving and timing connections from the primary means, for the needle and strand laying means, a one revolution driving shaft connection from the secondary timing means to the tying device, and means on said shaft operating said terminal forming and clamp releasing means.

32. A mechanism according to claim 4 together with strand terminal forming means forward of the tying device and clamp releasing means rearward thereof, primary and secondary timing means, driving and timing connections from the primary means for the needle and strand laying means, a one revolution driving shaft connection from the secondary timing means to the tying device, and means on said shaft operating said terminal forming and clamp releasing means substantially simultaneously at the close of operation of the tying device.

References Cited in the file of this patent

UNITED STATES PATENTS

| | | |
|---|---|---|
| 2,355,644 | Haase | Aug. 15, 1944 |
| 2,355,647 | Haase | Aug. 15, 1944 |
| 2,528,538 | Nolt | Nov. 7, 1950 |